(12) United States Patent
Benosman et al.

(10) Patent No.: US 10,915,108 B2
(45) Date of Patent: Feb. 9, 2021

(54) ROBUST SOURCE SEEKING AND FORMATION LEARNING-BASED CONTROLLER

(71) Applicant: Mitsubishi Electric Research Laboratories, Inc., Cambridge, MA (US)

(72) Inventors: Mouhacine Benosman, Boston, MA (US); Jorge Poveda, Goleta, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 369 days.

(21) Appl. No.: 15/939,695

(22) Filed: Mar. 29, 2018

(65) Prior Publication Data

US 2019/0302784 A1    Oct. 3, 2019

(51) Int. Cl.
*G05D 1/02* (2020.01)
*G05D 1/00* (2006.01)
*G08G 1/00* (2006.01)

(52) U.S. Cl.
CPC ......... *G05D 1/0221* (2013.01); *G05D 1/0088* (2013.01); *G05D 1/028* (2013.01); *G05D 1/0295* (2013.01); *G08G 1/00* (2013.01)

(58) Field of Classification Search
None
See application file for complete search history.

(56) References Cited

U.S. PATENT DOCUMENTS

| 7,211,980 B1 * | 5/2007 | Bruemmer | G05D 1/0246 |
| | | | 318/567 |
| 8,838,271 B2 | 9/2014 | Ghose et al. | |
| 2004/0030570 A1 | 2/2004 | Solomon | |

FOREIGN PATENT DOCUMENTS

| CN | 102096415 B | 9/2012 | |
| WO | WO-2009040777 A2 * | 4/2009 | ............. G06N 3/008 |

OTHER PUBLICATIONS

Particle Swarm Optimization for source localizationin environment with obstacles (a Non Patent Literature, Intelligent Control (ISIC), 2014 IEEE International Symposium, Publication Date: Dec. 1, 2014.

* cited by examiner

*Primary Examiner* — Kelly D Williams
(74) *Attorney, Agent, or Firm* — Gennadiy Vinokur; James McAleenan; Hironori Tsukamoto

(57) ABSTRACT

A vehicle control system for driving a vehicle toward a source while avoiding an obstacle includes a first sensor to measure a first intensity of a source signal from the source, a second sensor to detect an obstacle and a second vehicle. The system includes an interface to receive data of a second intensity of the source signal measured by the second vehicle and transmit the data of the first and second intensities via a wireless channel, a memory to store the data of the first and second intensities, an autonomous program, a leader algorithm and a follower algorithm for autonomously driving the vehicle, a processor to select and perform one of the leader algorithm and the follower algorithm and generate control signals, and a machinery control circuit to drive a machinery of the vehicle according the control signals.

18 Claims, 8 Drawing Sheets

ROBUST SOURCE SEEKING AND FORMATION LEARNING-BASED CONTROLLER

FIELD

The present disclosure relates generally to path planning of an object within an environment, in particular, generating physically realizable trajectories that guide the object from an initial location to a final location while avoiding collisions with obstacles in the environment.

BACKGROUND

Applications of multi-robot formation control is present in many fields, for instance, in factory automation where swarm of robots are used to carry large heavy equipment, or in warehouse applications where multi-robots are used to help workers pickup and deliver products from/to the warehouse. Another prevalent application nowadays, is in the field of building surveillance and maintenance, where multi-robots are used to check the building systems, like HVAC and elevator systems, and report any anomaly to maintenance staff.

In these applications the multi-robots rely on wireless communication to communicate between themselves and achieve the desired task. However, communications can be prone to noise and hacking attacks. For example, a simple noise added to the communication channels can disturb the performance of existing multi-agent control algorithms. For instance, in existing algorithms for formation control of multi-agent robots, a slight additive noise on the communication channel can make the formation get stuck or hit a given obstacle.

We propose here to design a robust control algorithm for multi-robot formation in the presence of obstacles, where the robustness is with respect to any noise on the robots' communication channels or local measurements. This inherent robustness makes our algorithm robust by adding noise in the communication channels or the sensors.

In view of the foregoing, there is a continuing need for improved systems and techniques for autonomous mobile robots transporting or moving toward a source while avoiding obstacles.

SUMMARY

The present disclosure is based on the realization that a vehicle control system allows a vehicle for driving the vehicle toward a source while avoiding an obstacle. The vehicle control system includes a first sensor to measure a first intensity of a source signal from the source, wherein a distance to the source is unmeasurable; a second sensor to detect an obstacle and a second vehicle, wherein the second sensor measures a first distance to the obstacle and a second distance to the second vehicle; an interface to receive data of a second intensity of the source signal measured by the second vehicle and transmit the data of the first and second intensities via a wireless channel; a memory, in connection with the interface and the first and second sensors, to store the data of the first and second intensities, an autonomous program, a leader algorithm and a follower algorithm for autonomously driving the vehicle; a processor, in connection with the memory, to select one of the leader algorithm and the follower algorithm based on the data of the first and second intensities using the autonomous program and generate control signals including driving parameters of the vehicle according to the selected one of the algorithms; and a machinery control circuit connected to the processor to drive a machinery of the vehicle according the control signals.

Another realization of the present disclosure is based on recognition that a non-transitory computer readable recording medium storing thereon a program causes a processor to execute a vehicle control process for driving a vehicle toward a source while avoiding an obstacle. The vehicle control process includes steps measuring, using a first sensor, a first intensity of a source signal from the source, wherein a distance to the source is unmeasurable; detecting, using a second sensor, an obstacle and a second vehicle, wherein the detecting includes measuring a first distance to the obstacle and a second distance to the second vehicle; receiving, using an interface, data of a second intensity of the source signal measured by the second vehicle, and transmitting the data of the first and second intensities via a wireless channel; storing, using a memory in connection with the interface and the first and second sensors, the data of the first and second intensities, an autonomous program, a leader algorithm and a follower algorithm for autonomously driving the vehicle; selecting, using the processor in connection with the memory, one of the leader algorithm and the follower algorithm based on the data of the first and second intensities using the autonomous program, and generating control signals including driving parameters of the vehicle according to the selected one of the algorithms; and transmitting the control signal to a machinery control circuit connected to the processor to drive a machinery of the vehicle according the control signals.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1:
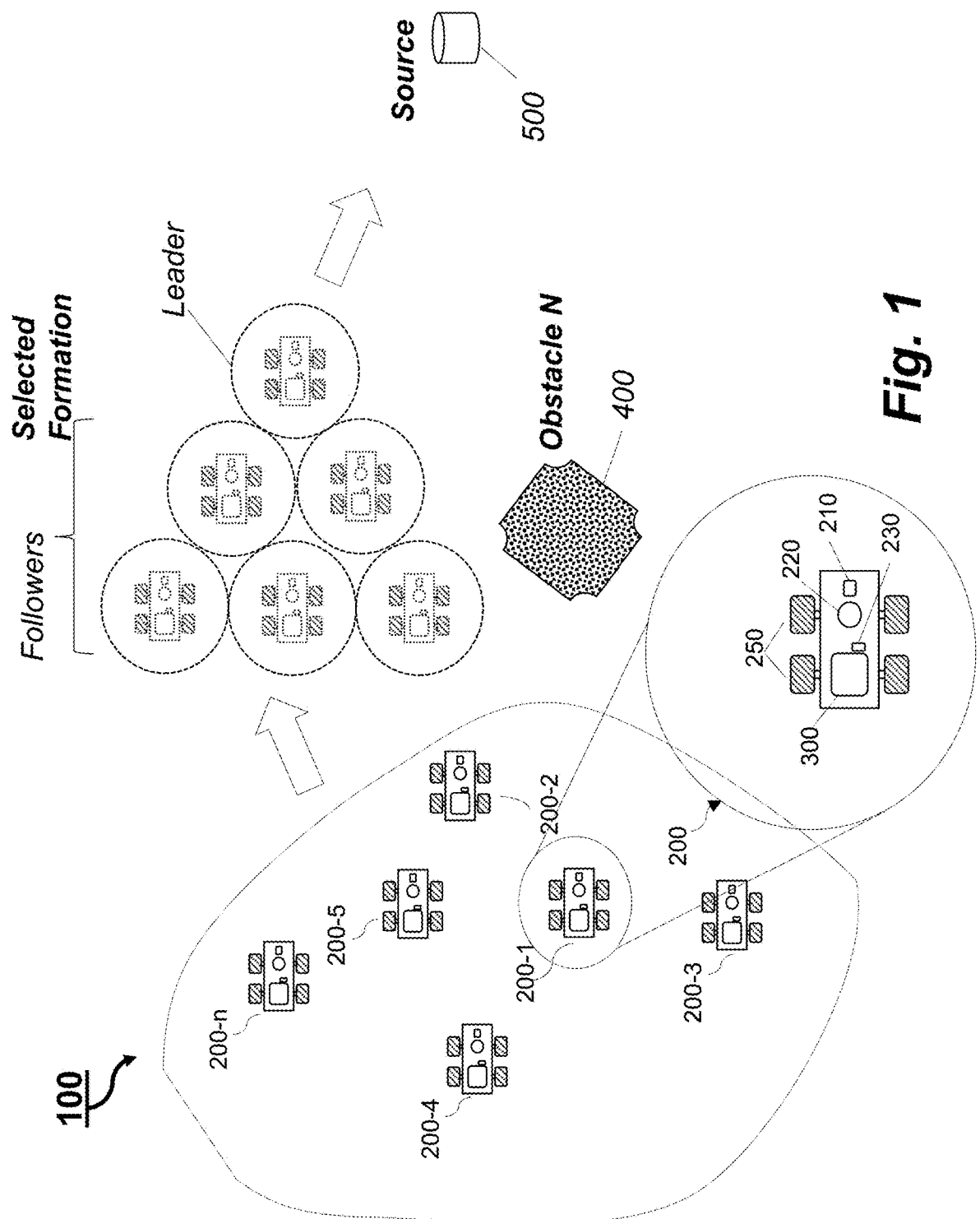
FIG. 1 is an example illustrating a robust formation control system, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is an example illustrating a robust formation control system 100 according to some embodiments of the present disclosure. The formation control system 100 includes autonomous vehicles 200, in which the vehicles 200 are numbered from 200-1 to 200-$n$. In this case, each autonomous vehicle 200 can transport or move toward a source 500 with other autonomous vehicles 200 while avoiding an obstacle 400 according to a formation algorithm selected from predetermined formation algorithms. Each autonomous vehicle 200 includes a source sensor (first sensor) 210 to detect an information signal or a signal intensity from the source 500, an object detector (distance detector or second sensor) 220 to measure distances from the vehicle to neighboring vehicles. For instance, when the vehicle of interest is the vehicle 200-1, the neighboring vehicles can be the vehicles 200-2, 200-3, 200-4 and 200-5. The autonomous vehicle 200 also includes an autonomous operation system 300 and a machinery 250 to transport toward directions according to a control program of the autonomous operation system 300. Further, in some cases, the autonomous vehicle 200 may include handling robotics (not shown) or the like, which can pick or bring up things to be removed or to operate machines disposed around the source 500 or on the source 500.

Figure 2:
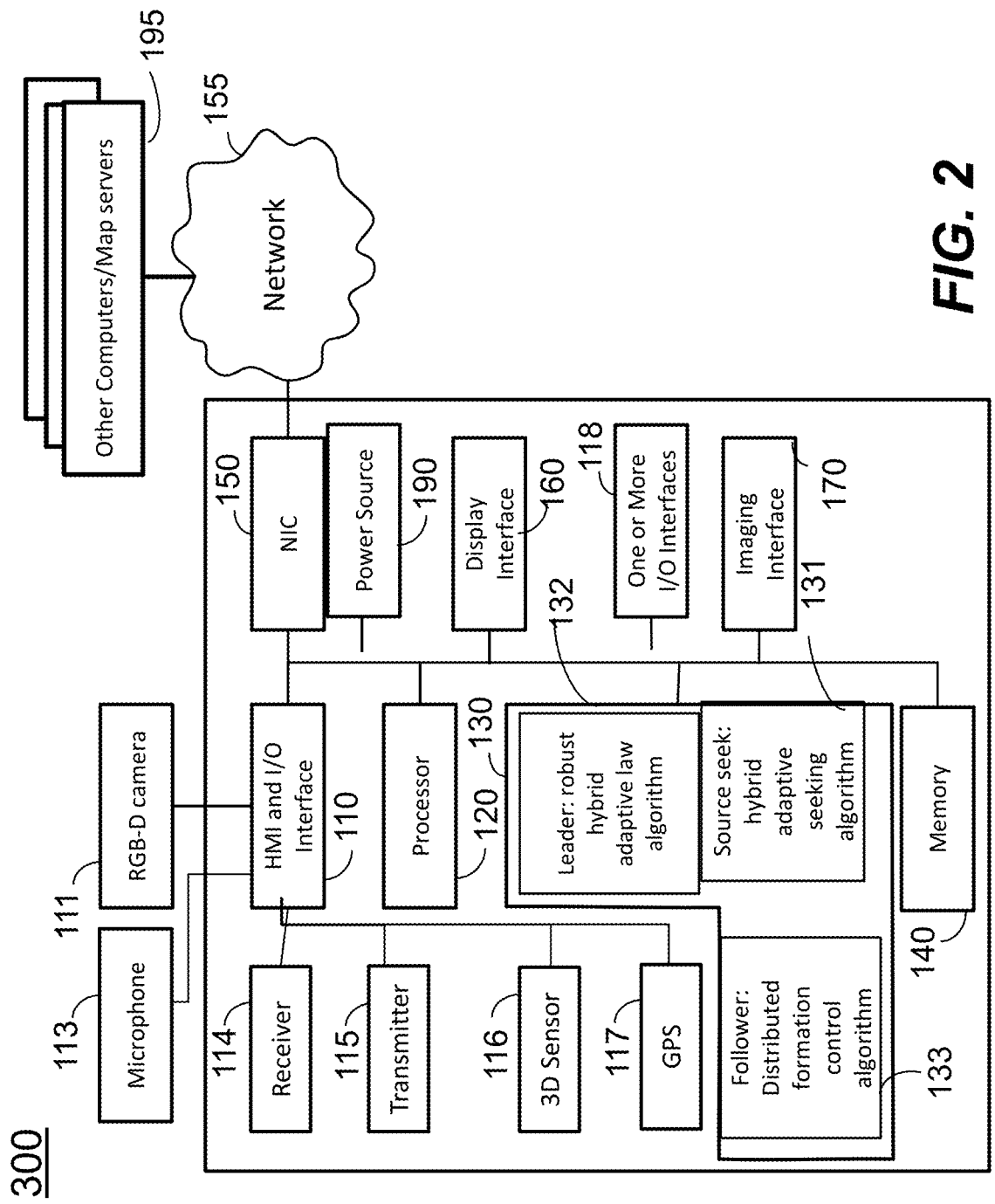
FIG. 2 is a block diagram illustrating an autonomous control system of an autonomous vehicle, according to embodiments of the present disclosure.

FIG. 2 is a block diagram illustrating an autonomous control system 300 of an autonomous vehicle 200, according to embodiments of the present disclosure.

The autonomous control system 300 of the autonomous vehicle 200 can include a human machine interface (HMI) with input/output (I/O) interface 110 connectable with at least one RGB-D camera 111 (depth camera, distance measurable against other vehicles), a microphone 113, a wireless receiver 114, a wireless transmitter 115, a 3D sensor 116, a global positioning system (GPS) 117, one or more I/O interfaces 118, a processor 120, a storage device 130, a memory 140, a network interface controller 150 (NIC) connectable with other computers and Map servers via a network 155 including a wireless networks and local area networks and internet network (not shown), a display interface 160 connectable to a display device (not shown), an imaging interface 170 connectable with an imaging device (not shown). The HMI with I/O interface 110 may include analog/digital and digital/analog converters. The HMI with I/O interface 110 may include a wireless communication interface that can communicate with other object detection systems, localization systems, other computers or map servers via wireless internet connections or wireless local area networks.

The wire communication interface in the HMI with I/O interface 110 can communicate with the other computers and the map servers via the network 155. The autonomous control system 300 can include a power source 190. The power source 190 may be a battery rechargeable from an external power source (not shown) via the I/O interface 118. Depending upon the application the power source 190 may be optionally located outside of the vehicle 200, and some parts may be pre-integrated in a single part.

The HMI and I/O interface 110 and the I/O interfaces 118 can be adapted to connect to another display device (not shown) including a computer monitor, camera, television, projector, or mobile device, other computers among others.

The storage device 130 includes a source seeking program 131, a leader algorithm (program module) 132 and a follower algorithm (program module) 133. The program modules 131, 132 and 133 can be stored into the storage 130 as program codes. The autonomous control can be performed by executing the instructions of the programs stored in the storage 130 using the processor 120. Further, the program modules 131, 132 and 133 may be stored to a computer readable recording medium (not shown) so that the processor 120 can perform the autonomous control according to the algorithms by loading the program modules from the medium. Further, the pointing device/medium 112 may include modules that read programs stored on a computer readable recording medium.

In order to start acquiring a source signal data using the sensor 116, instructions may be transmitted to the system 100 using the pointing device/medium 112 or via the wireless network or the network 190 connected to other computers 195.

The acquiring of the point cloud may be started in response to receiving an acoustic signal of a user by the microphone 113 using pre-installed conventional speech recognition program stored in the storage 130.

The processor 120 may be a plurality of processors including one or more graphics processing units (GPUs). The storage 130 may include speech recognition algorithms (not shown) that can recognize speech signals obtained via the microphone 113.

Further, the autonomous control system (vehicle control system) 300 may be simplified according to the requirements of system designs. For instance, the autonomous control system 300 may be designed by including the RGB-D camera 111, the interface 110, the processor 120 in associating with the memory 140 and the storage 130 storing the semantic labeling program 131 and image classification 132 and image segmentation algorithms 133, and other combinations of the parts indicated in FIG. 2.

According to some embodiments of the present disclosure, the robust formation control system 100 can provide autonomous vehicles 200. Each of the autonomous vehicles 200 is configured to communicate with other vehicles 200 via a wireless channel using the interface 110 connected to a receiver 114 and a transmitter 115. Each of the autonomous vehicles 200 includes a source sensor 210 to detect and measure a intensity (first intensity) of a source signal of a source 500 and a distance sensor 220 to measure a distance to the obstacle 400. In this case, the distance to the source 500 may be unmeasurable as long as the intensity of the signal from the source 500 is measurable. Further, the interface 110 can receive data of an intensity (second intensity) of the source signal measured by another vehicle and transmit the data of the first and second intensities via a predetermined wireless channel so that neighboring other autonomous vehicles 200 can receive the data of the first and second intensities. In this manner, the whole autonomous vehicles 200 (200-1~200-$n$) can collect the other intensities (first intensities) measured by the other vehicles.

Further, each vehicle 200 includes antennas (not shown) of the receiver 114 and the transmitter 115 to receive data of another source signal from another vehicle and transmit the source signal to the other vehicle.

A memory 140 operates in connection with the interface and the first and second sensors, the storage 130 and the processor 120. The memory 140 can store and load an autonomous program (not shown), a source seeking algorithm 131, a leader algorithm 132 and a follower algorithm 133 from the storage 130 for autonomously driving the vehicle 200.

The processor 120 operates in connection with the memory 140 and the storage 130 and executes the autonomous program that selects one of the leader algorithm and the follower algorithm based on the source signal and the other source signal, and to compute and generate control signals using the selected one of the algorithms, wherein the control signals indicate driving parameters of the vehicle 200.

The autonomous vehicle 200 includes a machinery 250 connected to the processor 120 via the interface 110 to drive the vehicle 200 according to the control signals.

In some cases, the leader algorithm 132 can include a hybrid-extreme-seeker algorithm 132, and the follower algorithm 133 can be a formation control algorithm.

Further, each vehicle 200 can communicate with other vehicles 200 via the interface 110 in connection with the receiver 114 and the transmitter 115 according to a message passing algorithm (not shown) stored in the memory. In accordance with an embodiment, an autonomous vehicle 200 communicates with neighboring vehicles. For instance, when an autonomous vehicle of interest is the autonomous vehicle 200-5, its neighboring vehicles can be the vehicles 200-1, 200-2, 200-4 and 200-$n$. The vehicle of interest does not need to directly communicate a second neighbor vehicles, such as the vehicle 200-3.

When the autonomous vehicles 200-1~200-$n$ are arranged in a working field, working floor, or working ground, each of the autonomous vehicles 200-1-200-$n$ starts detecting an intensity of the source signal 500 and stores the intensity value of the detected signal into the dataset table (datatable). As each of the autonomous vehicles 200-1~200-$n$ is assigned an identification (ID) number or an ID code, an intensity (value) of the source signal 500 measured by a vehicle of interest is stored into the dataset table of the storage 130 or memory 140 with the corresponding ID code of the vehicle of interest.

The total number n of the autonomous vehicles 200-1~200-$n$ may be preliminary determined and stored into the storage 130 or the memory 140 of each vehicle 200, and each vehicle 200 includes a dataset table (not shown) in the storage 130 or the memory 140 for recording and comparing signal intensities detected by the vehicles 200-1~200-$n$. For instance, when the total number of the vehicles 200 is n (natural number), the dataset table stores n of signal intensities of the vehicles 200-1~200-$n$.

In this case, the vehicle 200-5 detects a source signal valued of the vehicle 2005 and receives the source signal values of the vehicles 200-1, 200-2, 200-4 and 200-$n$. Although the vehicle 200-5 does not directly receive the source signal value of the vehicle 200-3, the neighboring vehicles 200-1 and 200-4 can provide the source signal value of the vehicle 200-3 to the vehicle 200-5 via wireless communications.

Once, each of the autonomous vehicles 200-1~200-$n$ obtains and records the whole signal intensities of the vehicles 200-1~200-$n$ into the dataset table, the processor 120 of each of the vehicles 200-1~200-$n$ determines, from the vehicles 200-1~200-$n$, a leader vehicle that has the maximum signal value on the dataset table.

In other words, the autonomous program (not shown) stored in the storage 130 or memory 140 selects the leader algorithm 132 when an intensity of the source signal from the source 500 is the greatest among that of the other source signals, and causes the machinery of the leader vehicle to start moving at an earliest time instant in a predetermined cycle period of time.

For example, when one of the vehicles 200-1~200-$n$ is selected as the leader vehicle, the processor 120 of the leader vehicle selects/loads the source seeking algorithm 131 and the leader algorithm 132 to start the leader movement according to the algorithms 131 and 132, and the rest of the vehicles select/load the follower algorithm 133 to start the follower movements according to a formation determined by the follower algorithm 133 while avoiding the obstacle 400.

Further, the type of signal to be detected from the source 500 by using the source sensor 210 can be predetermined or determined from the network 155. The signal type may be a radar signal, an electro-magnetic wave signal including an RF (radio wave frequency) signal, a sound signal, a photon signal with a wavelength ranging from infrared wavelength to a gamma ray including an X-ray. The source sensor 210 can include an antenna or detector (not shown) to detect the predetermined type signal from the source 500.

In some cases, the total number n of the autonomous vehicles 200 may be one (a single one), in such a case, the single autonomous vehicle 200 selects the leader and source seeking algorithms 132 and 131 and starts moving as a leader vehicle with the leader movement according to the algorithms 132 and 131. For example, the leader algorithm may be a hybrid-extreme-seeker algorithm, which is described later in detail.

Further, as the distance sensor 220 can measure second distances to the other vehicles, the processor 120 can determine neighbor vehicles based on the second distances.

Further, the source sensor 210 of each vehicle 200 detects an intensity of the source signal from the source 500. In this case, the distance to the source 500 is unmeasurable for the vehicles 200. Generally, as the vehicles 200 locate at different distances from the source 500, the vehicles 200 receive different intensities of the source signal from the source 500. Accordingly, a single vehicle can be determined as a leader vehicle from multiple autonomous vehicles 200, as the greatest intensity of the source signal can be determined.

According to some embodiments of the present disclosure, a single leader vehicle can be determined by the following procedure.

For instance, when a first intensity of a vehicle of interest is greater than the second and third intensities received via the interface 110, the processor 120 selects the leader algorithm 132. In this case, it is assumed that another or more other vehicles 200 are arranged in the working place of the vehicles.

When the first intensity is less than one of the second and third intensities, the processor selects the follower algorithm. Further, when the first intensity is equal to one of the second and third intensities, the processor selects the leader algorithm if a first timestamp of the first intensity is earlier than a second timestamp of the second intensity otherwise the processor selects the follower algorithm. As each of the vehicles 200 independently performs the procedure above, a single leader vehicle can be determined or selected from among the whole vehicles 200.

In other cases, when the interface 110 of a vehicle of interest among the vehicles 200 further receives third intensities measured by third vehicles among the vehicles 200, the processor 120 selects the leader algorithm 132 when the first intensity is greater than the third intensities. When the first intensity is less than the third intensities, the processor 120 selects the follower algorithm 133. When the first intensity is equal to the greatest intensity among the third intensities and if a first timestamp of the first intensity is earlier than a second timestamp of the greatest intensity the processor 120 selects the leader algorithm, otherwise the processor 120 selects the follower algorithm. As the intensities measured by the vehicles 200 are recorded with a timestamp indicating the measurement time and date, each of the intensities measured by the vehicles 200 is identifiable or different from the others by use of the timestamp and the ID data assigned to each of the vehicles 200.

The vehicle control system 300 further includes a machinery control circuit (not shown) connected to the processor 120. The machinery control circuit generates control signals that includes driving parameters, such as a direction, a velocity and a movement time period, which are computed by the processor 120 based on the leader algorithm or the follower algorithm. The control signals are transmitted to a machinery 250 to drive the vehicle 200 according to the control signals.

As mentioned above, the autonomous vehicles 200 can communicate with each other via the interface 110 connected to the receiver 114 and the transmitter 115 with the predetermined wireless channel. The communications between the vehicles 200 may be performed based on a message passing algorithm stored in the memory 140, in which the message passing algorithm allows each of the vehicles to communicate with neighboring vehicles.

Further, according to embodiments of the present disclosure, a vehicle using the leader algorithm may be referred to as a leader vehicle, and vehicles using the follower algorithm can be referred to as follower vehicles. In this case, the follower algorithm can be a formation control algorithm.

Further, the second vehicle is not detected by the second sensor of a vehicle of interest, the processor 120 selects the leader algorithm 132. This corresponds to a situation where only a single vehicle exists in the working field.

When the processor 120 selects the follower algorithm 133, the control signals may cause the machinery 250 to start moving after the second sensor 220 detects a movement of the second vehicle, in which case the detection of the movement can be determined when the processor 120 recognizes that at least one second distance to a neighbor vehicle has changed while updating the second distance using the second sensor 220. For example, the updating of the second distance can be performed every predetermined time period by re-measuring the second distance.

For avoiding the obstacle 400, the processor 120 can compute a virtual boundary (not shown) around the obstacle 400 so that each of the vehicles 200 can maintain a predetermined minimum distance away from the virtual boundary.

According to an embodiment of the present disclosure, the leader vehicle among the autonomous vehicles 200 can be switched to one of the follower vehicles 200 by transmitting a predetermined failure signal via the interface 110 when a failure occurs in the leader vehicle. For instance, the leader switching can be performed by procedures described below.

When the processor 120 of the leader vehicle detects at least one of predetermined failure signals (failure flags) from the first sensor 210 or the second sensor 220 while executing the leader algorithm, the processor 120 generates and transmits a leader switching request signal via the interface 110. The predetermined failure signals can be determined based on signal values of the first intensity (source intensity from the source 500), the distance to the obstacle 400, In some cases, when the processor 120 of a leader vehicle recognizes that the intensity of the source signal 500 measured by the first sensor 210 has not changed for a threshold time period, the processor 120 recognizes a failure status. Further, the processor 120 can recognize the failure status when a distance measured by the second sensor 210 indicates the distance failure. The distance failure is determined when the processor 120 recognizes that the distance to the obstacle 400 has not changed for a threshold time period while updating the distance to the obstacle 400 or that a position acquired by the GPS 117 of the leader vehicle has not changed for the threshold time period. In some cases, the follower vehicles can receive the failure signal of the leader or the leader switching request signal from another control system (not shown) outside the working field of the vehicles 200 using wireless communications via the interface 110.

Once the follower vehicles receive the failure signal or the leader switching request signal, each of the follower vehicle starts measuring a source intensity from the source 500 and communicates with other follower vehicles to reselect one of the leader and follower algorithms, and then starts operating the selected algorithm. After the selection process of the leader or follower algorithm is completed, the total number n of the vehicles 200 stored in each of the vehicles 200 is updated to a total number n−1, so that the leader algorithm, the follower algorithm and the message passing algorithm can update the total number for their further computing operations (data processing).

Further, when the processor 120 of a follower vehicle detects a failure signal from the leader vehicle via the interface 110 while executing the follower algorithm 133, the processor 120 updates the first intensity, the second and third intensities of the vehicles. For example, the processor 120 selects the leader algorithm 132 when the updated first intensity of the vehicle itself is greater than the updated third intensities. Further, the processor selects the follower algorithm when the updated first intensity is less than the updated third intensities. When the updated first intensity is equal to a greatest intensity among the updated third intensities and if a first timestamp of the updated first intensity is earlier than a second timestamp of the updated greatest intensity, the processor 120 selects the leader algorithm 132, otherwise the processor 120 selects the follower algorithm 133. By completing the above procedure, a single leader vehicle with the follower vehicles can be determined.

Further, the follower vehicles can recognize the failure statuses of itself and the other follower vehicles when detecting follower failure signals (flags). The follower failure signals may be related to motion signals (information on the movements) of the follower vehicles. For instance, the motion signals include a velocity, a moving angle toward the source 500 or a relative angle determined by the moving direction and a direction toward the obstacle 400, or the like.

When a distance to one of the neighbor vehicles measured by the second sensor 120 has not changed for a threshold time period while updating the distances to the neighbor vehicles.

After the update of the follower algorithm is completed, the total number n of the vehicles 200 stored in each of the vehicles 200 is updated to a total number n−1, so that the leader algorithm, the follower algorithm and the message passing algorithm can update the total number for their further computing operations (data processing).

The total number of the vehicles 200 can also be increased by adding extra(additional) autonomous vehicle(s) 200 (not shown) from outside the working field using another vehicle arrangement system (not shown) that is capable of bringing vehicles to the working field. In such a case, an algorithm update request signal is transmitted from the other system (not shown) via the wireless communications and an update process of the leader algorithm and follower algorithm is performed by each of the vehicles 200 and the vehicle(s) 200 so that the leader vehicle and the follower vehicles are newly determined and start moving according to their selected algorithms. When the number of the added vehicle(s) 200 is in, the total number n of the vehicles is updated to m+n (m, n, natural number).

Accordingly, the autonomous vehicles 200 described above can improve upon existing autonomous vehicle systems, because it provides a map-free source seeking capability, with simple computations, requiring low computation power. Furthermore, the autonomy of the group of vehicles is obtained by distributed communication between vehicles, without the need of a central control system.

As discussed above, the present disclosure describes a novel data-driven robust hybrid control law, which in contrast to the general smooth approaches, overcomes the limitations imposed by the topological constraints induced by the obstacle 400, guaranteeing convergence of the vehicle 200 to a neighborhood of the source 500 of the signal from every initial condition away from the obstacle 400. Since our final goal is to steer a group of vehicles towards the unknown source signal J of the source 500, we implement a leader-follower control approach, where the leader agent implements the data-driven hybrid seeking law 132 (leader algorithm 132), and the followers implement a distributed formation control 133 (follower algorithm 133) that operates in a faster time scale. Each of the vehicles 200 includes a processor 120 (computer) and a memory 140 (and/or storage 130) operating with the processor 120. The vehicles 200 may be referred to as apparatuses, machines or robots that include machineries to move according to predetermined processor (computer) executable algorithms or programs stored in the memory or storage. The machineries can be driving wheels, mechanical legs, caterpillar machines or other transporting mechanics. By an appropriate geometric design of the hybrid law and the prescribed formation of the vehicles, the group of vehicles can be guaranteed to preserve the formation as the leader steers the group towards the source of the unknown signal J. The hybrid feedback law is based on recent results on hybrid extremum seeking control (HESC), robust hybrid controllers for systems with topological constraints, and classic coordination algorithms for formation control in multi-agent systems. However, unlike the type of HESCs, the feedback law described according to the present disclosure achieves data-driven seeking without injecting the excitation signal directly to the state of the controller, but rather by injecting the signal through the dynamics of the feedback law, similarly as it is done in non-hybrid extremum seekers.

In the following, we will describe the models and theories regarding the leader algorithm, the source seeking and the follower algorithm in more detail.

Problem Statement

In the following, we consider a group of N autonomous vehicles, each vehicle modeled as a 2D point mass with dynamics $$\left.\begin{array}{l} \dot{x}_i = u_{x,i} \\ \dot{y}_i = u_{y,i} \end{array}\right\}, \forall\, i \in \{1, \ldots, N\}, \qquad (1)$$

where $u_{x,i}, u_{y,i} \in R$ are independent velocity inputs to the vehicle. Without loss of generality we assume that the vehicle i=1 is the leader vehicle, and that the vehicles share information via a directed unweighted time-invariant graph G={V,E}, where V is the set of nodes representing the N vehicles, and E is the set of edges representing the communication links between vehicles, i.e., between neighboring vehicles. We impose the following assumption on this communication graph.

Assumption 1.1 The node corresponding to the leader vehicle, which has been selected by the autonomous program, is a globally reachable node for the graph G={V,E}.

For the problem under consideration in this paper we assume that there exists an unknown signal J that can be measured by the leader vehicle, and which attains its maximum value J* at some unknown point $(x^*, y^*) \in R^2$. As in [?], [?], and [?], this signal may represent chemical concentrations, electromagnetic fields, wifi signals, acoustic sounds, etc. However, for the purpose of analysis we assume that J satisfies the following assumption.

Assumption 1.2 The function $J:R^2 \to R$ is smooth and it has a strict local maximum $(x^*, y^*) \in R^2$. Moreover, the set $\{(x,y):J(x,y) \geq \alpha, \alpha \in R\}$ is compact and contains no equilibria other than $(x^*, y^*)$.

Let $\Xi := \{(x_1^f, y_1^f) \ (x_2^f, y_2^f), \ldots, (x_N^f, y_N^f)\}$ be a collection of N positions in the plane. Then, we say that the N vehicles satisfy the formation specification $\Xi$ (formation control) if $x_i = x_i^f + \zeta_x$ and $y_i = y_i^f + \zeta_y$ for all $i \in V$ and for any $\zeta_x \in R$ and $\zeta_y \in R$. Thus, we say that the vehicles achieve formation if they converge to the set $$F_\Xi := \{(x_i, y_i) \in R^2 : x_i = x_i^f + \zeta_x, y_i = y_i^f + \zeta, \forall (i,j) \in V, (\zeta_x, \zeta_y) \in R^2\}. \quad (2)$$

Note that the set (2) is equivalent to the consensus set where $x_i - x_j = x_i^f - x_j^f$ and $y_i - y_j = y_i^f - y_j^f$ for all $(i,j) \in V$. We say that a formation $\Xi$ is feasible if the set (2) is not empty.

Assumption 1.3 The formation $\Xi$ is feasible with $x_1^f = 0$ and $y_1^f = 0$.

Finally, we also consider the presence of an obstacle $N \subset R^2$, whose position is known for the leader. Based on this, our main goal in this paper is to design a distributed and robust feedback law that guarantees that the set of N vehicles will converge to a neighborhood of the unknown point $(x^*, y^*)$ that maximizes J, avoiding the obstacle N, and maintaining a prespecified formation $\Xi$.

Robust Adaptive Hybrid Dynamics

In order to solve the source seeking problem with obstacle avoidance and formation control, we design a feedback law (hybrid adaptive seeking algorithm 131) where the leader vehicle implements a robust hybrid adaptive law 132 (or robust hybrid adaptive law algorithm 132) that guarantees robust obstacle avoidance and convergence to a neighborhood of the source. At the same time, the follower vehicles implement a distributed formation control algorithm 133 that guarantees that any prespecified and feasible formation parametrized by the leader's position is achieved. Then, considering the complete MAS, and by an appropriate geometric design of the leader's hybrid adaptive law, the team of vehicles can be steered towards a neighborhood of the point $(x^*, y^*)$ that maximizes the unknown signal J, while maintaining the prespecified formation.

To present the key ideas behind the adaptive law, and to motivate the implementation of a hybrid controller, we start by considering a non-hybrid law for the leader, which solves the source seeking problem when no obstacles exist. After this, we "hybridize" this law in order to solve, in a robust way, the source seeking problem with obstacle avoidance. Finally, we interconnect the leader with the follower vehicles, who implement a distributed formation control whose position is parametrized by the position of the leader.

2.1 Smooth Seeking Dynamics for the Leader: The Obstacle-Free Case

For the case when there is no obstacles, we consider a velocity adaptive control law for the leader vehicle, given by $$u_{x,1} = a \cdot \omega \cdot \mu_2 + k \cdot \xi_x \quad (3)$$

$$u_{y,1} = a \cdot \omega \cdot \mu_1 + k \cdot \xi_y \quad (4)$$

where $k = \sigma \cdot \bar{\omega}$, and $$\dot{\xi}_x = -\bar{\omega} \cdot \left(\xi_x - \frac{2}{a} J(x,y) \cdot \mu_1\right) \quad (5)$$

$$\dot{\xi}_y = -\bar{\omega} \cdot \left(\xi_y - \frac{2}{a} J(x,y) \cdot \mu_2\right), \quad (6)$$

and $$\left.\begin{array}{l} \dot{\mu}_1 = \omega \cdot \mu_2 \\ \dot{\mu}_2 = -\omega \cdot \mu_1 \end{array}\right\}, \mu = [\mu_1, \mu_2]^T \in S^1. \quad (7)$$

In this case, we generate the excitation signals $\mu_1$ and $\mu_2$ by means of the time-invariant oscillator (7). Also, for simplicity we have ignored any dynamics related to the sensors of the vehicles. To analyze this control law, we consider the time-invariant change of variables $$\tilde{x} = x_1 - a\mu_1, \tilde{y} = y_1 - a\mu_2. \quad (8)$$

and the new time scale $\tilde{\rho} = \bar{\omega} t$. With these new variables the closed-loop system in the $\tilde{\rho}$-time scale has the form $$\dot{\xi}_x = -\left(\xi_x - \frac{2}{a} J(\tilde{x} + a\mu_1, \tilde{y} + a\mu_2) \cdot \mu_1\right) \quad (9)$$

$$\dot{\xi}_y = -\left(\xi_y - \frac{2}{a} J(\tilde{x} + a\mu_1, \tilde{y} + a\mu_2) \cdot \mu_2\right) \quad (10)$$

$$\dot{\tilde{x}} = \sigma \cdot \xi_x \quad (11)$$

$$\dot{\tilde{y}} = \sigma \cdot \xi_y \quad (12)$$

$$\left.\begin{array}{l} \frac{\omega}{\bar{\omega}} \cdot \dot{\mu}_1 = \mu_2 \\ \frac{\omega}{\bar{\omega}} \cdot \dot{\mu}_2 = -\mu_1 \end{array}\right\}, \mu \in S^1. \quad (13)$$

For values of $$\frac{\omega}{\bar{\omega}}$$

small we can analyze system (3)-(7) based on averaging results for nonlinear systems. The average system is obtained by averaging the dynamics (9)-(12) along the solutions of the oscillator (13). Since the dynamics (11) and (12) do not explicitly depend on the state $\mu$, the averaging step only affects the dynamics (9) and (10). To obtain the average system we can do a Taylor series expansion of $J(\cdot)$ around $[\tilde{x} + a\mu_1, \tilde{y} + a\mu_2]^T$ obtaining $$J(\tilde{x} + a\mu_1, \tilde{y} + a\mu_2) = J(\tilde{x}, \tilde{y}) + a[\mu_1, \mu_2] \begin{bmatrix} \frac{\partial J(\tilde{x}, \tilde{y})}{\partial \tilde{x}} \\ \frac{\partial J(\tilde{x}, \tilde{y})}{\partial \tilde{y}} \end{bmatrix} + e_r, \quad (14)$$

where the term $e_r$ is of order $O(a^2)$. The following lemma, proved in the appendix, is instrumental to analyze system (3)-(7) via averaging theory.

Lemma 2.1 Every solution of (13) satisfies $\int_0^{2\pi} \mu_i(t) dt = 0$, and $$\frac{1}{2\pi} \int_0^{2\pi} \mu_i(t)^2 dt = \frac{1}{2}, \int_0^{2\pi} \mu_i(t) \mu_j(t) dt = 0 \quad (15)$$

for all $i \in \{1, 2\}$ such that $i \neq j$.

Replacing (14) in (3)-(7), and using Lemma 2.1, by averaging the right hand side of (9)-(12) over one period of the periodic signals μ, we obtain the average system in the $\tilde{\rho}$-time scale, given by $$\dot{\xi}_x^A = -\left(\xi_x^A - \frac{\partial J(\tilde{x}^A, \tilde{y}^A)}{\partial \tilde{x}^A} + e_r\right) \quad (16)$$

$$\dot{\xi}_y^A = -\left(\xi_y^A - \frac{\partial J(\tilde{x}^A, \tilde{y}^A)}{\partial \tilde{y}^A} + e_r\right) \quad (17)$$

$$\dot{\tilde{x}}^A = \sigma \cdot \xi_x^A \quad (18)$$

$$\dot{\tilde{y}}^A = \sigma \cdot \xi_y^A. \quad (19)$$

Considering the new time scale $\alpha = \sigma \cdot \tilde{\rho}$, system (3)-(7) is in singular perturbation form for values of $\sigma > 0$ sufficiently small, with dynamics (16)-(17) acting as fast dynamics, and dynamics (18)-(19) acting as slow dynamics. The stabily of the fast dynamics is analyzed by setting $\sigma=0$ in (18)-(19), which frozes the states $\tilde{x}$ and $\tilde{y}$. Then, by linearity of (16)-(17), these dynamics are exponentially stable with $\xi^A + \nabla J + e_r$. To obtain the slow dynamics we replace by $\nabla J + e_r$ in (18)-(19), obtaining the following system in the $\alpha$-time scale $$\dot{\tilde{z}}_x = \frac{\partial J(\tilde{z}_x, \tilde{z}_y)}{\partial \tilde{z}_x} + e_r \quad (20)$$

$$\dot{\tilde{z}}_y = \frac{\partial J(\tilde{z}_x, \tilde{z}_y)}{\partial \tilde{z}_y} + e_r, \quad (21)$$

where again the terms $e_r$ are of order $O(a^2)$. Therefore, under an appropriate tuning of the parameters $$\left(\frac{\bar{\omega}}{\omega}, \sigma, a\right),$$

the feedback control law given by equations (3)-(7) applied to the vehicle (1) approximates, on average and in the slowest time scale, a gradient ascent law.

2.2 Hybrid Seeking Dynamics for Robust Obstacle Avoidance

The discussion in the previous section shows that, provided Assumption 1.2 is satisfied, the smooth adaptive feedback law (3)-(7) can be tuned to guarantee robust semi-global practical convergence to (x*,y*) by generating solutions that approximate those of (3)-(7). However, the direct application of this same feedback law for the case when there are obstacles in the state space may be problematic, even when barrier functions are added to J to "push" the vehicle away from the obstacle.

Figure 3:
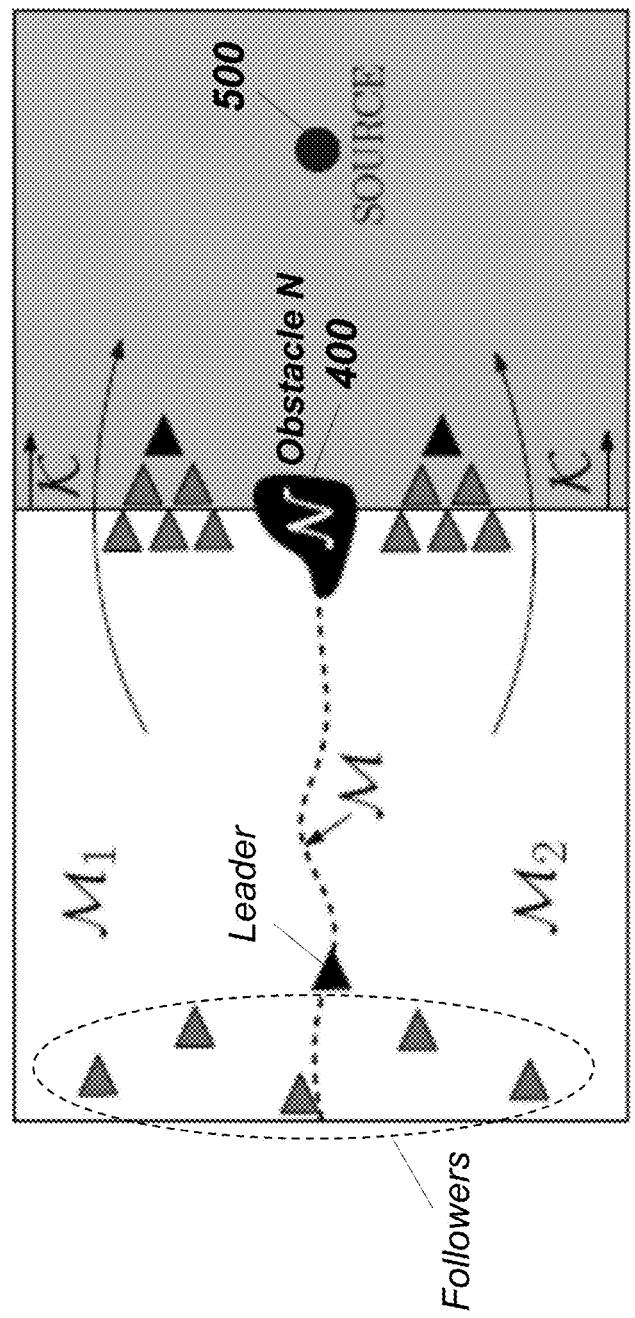
FIG. 3 is an example illustrating a group of vehicles following a leader vehicle that aims to converge to the source under the presence of the obstacle N, according to embodiments of the present disclosure.

FIG. 3 is an example illustrating a group of vehicles following a leader vehicle that aims to converge to the source under the presence of the obstacle N, according to embodiments of the present disclosure. Consider FIG. 3 where the state space has been divided in three parts $M_1$, $M_2$ and K, and consider a controller that generates a closed-loop time-invariant system of the form $$\dot{z} = f(\tilde{z}), \tilde{z}(0) = z_0, \quad (22)$$

where $f(\cdot)$ is assumed to be locally bounded, and where for all $z_0 \in R^2$ there exists at least one (Carathéodory) solution, being all solutions complete. Then, due to the topological properties of the problem, there exists a line M such that for initial conditions on each side of M, the trajectories of the system approach the set K either from above the obstacle or from below it. Because of this, it is possible to find arbitrarily small perturbations or noise signals e(t) acting on the system, such that some of the trajectories of the closed-loop system will remain in a neighborhood of the line M.

In words, for closed-loop systems based on a continuous gradient descent with barrier functions used to avoid the obstacle, there exists a set of points M (possibly of measure zero) such that from every point arbitrarily close to it, it is possible to find an arbitrarily small perturbation e(t) such that the solutions of the perturbed system will remain close to an arbitrarily small neighborhood of M. Note that it is not hard to extend this result for the case when the perturbation e(t) acts directly on the vector field $f$, pushing the solutions of the system towards M. Indeed, in many cases, the additive perturbation in (3)-(7) can be embedded as an additive perturbation on the states.

In order to address this issue and to guarantee that the adaptive feedback law is robust under small measurement noise, in this paper we propose to modify the dynamics (3)-(7) by partitioning the state space and adding a switching state $q \in \{1,2\}$.

The resulting adaptive feedback law is hybrid by nature, and it is constructed based on a mode-dependent localization function $J_q$ defined as $$J_q(x_1, y_1) := (x_1, y_1) + B(d_q(x_1, y_1)), \quad (23)$$

where $$d_q(x_1, y_1) = |[x_1, y_1]^T|_{R^2 \setminus O_q}^2.$$

The function $$|\cdot|_{R^2 \setminus O_q}^2$$

maps a position $(x_1, y_1) \in R^2$ to the squared valued of its distance to the set $R^2 \setminus O_q$, and $B(\cdot)$ is a barrier function defined as follows $$B(z) = \begin{cases} (z-\rho)^2 \log\left(\frac{1}{z}\right), & \text{if } z \in [0, \rho] \\ 0, & \text{if } z > \rho, \end{cases} \quad (24)$$

with $\rho \in (0,1]$ being a tunable parameter selected sufficiently small (tuning the virtual boundary).

Figure 4:
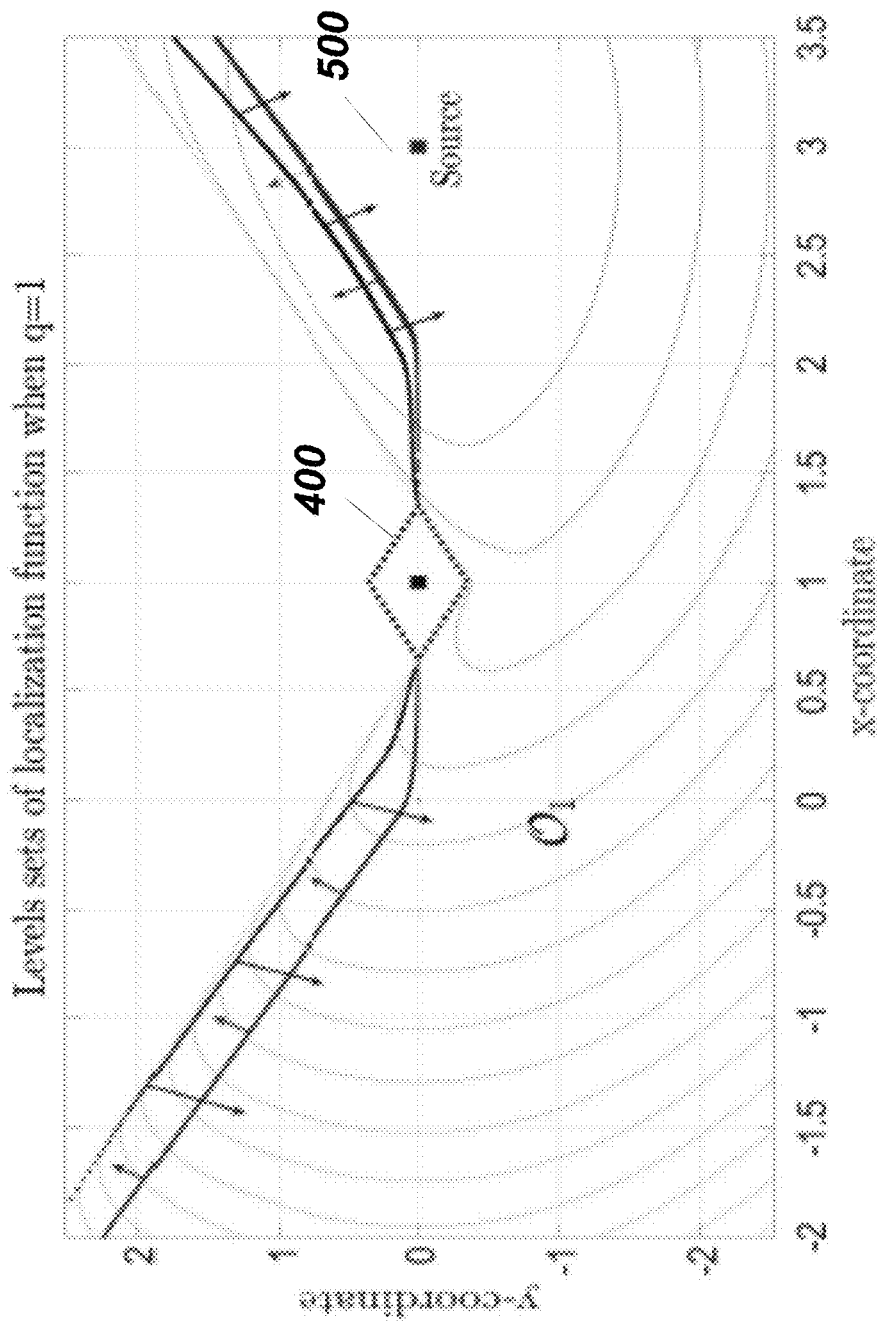
FIG. 4 shows a level set of a mode-dependent localization function over space, according to embodiments of the present disclosure.
Figure 5:
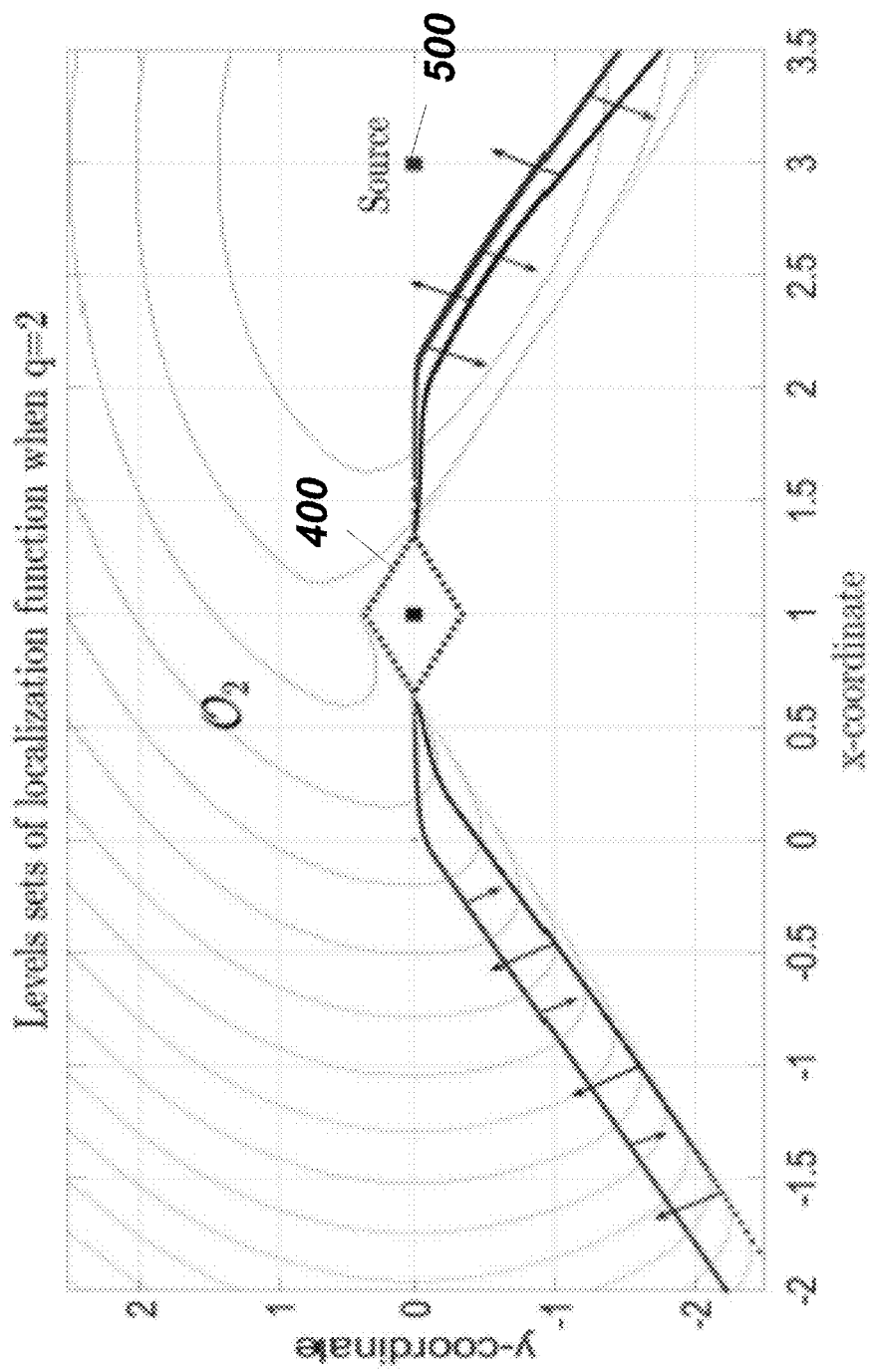
FIG. 5 shows a level set of a mode-dependent localization function J over space, according to embodiments of the present disclosure.

FIG. 4 shows a level set of a mode-dependent localization function over space, according to embodiments of the present disclosure, and FIG. 5 shows a level set of a mode-dependent localization function J over space, according to embodiments of the present disclosure.

The sets $O_1$ and $O_2$ are constructed as shown in FIGS. 4 and 5. Namely, we construct a box centered around the obstacle N, with tunable height h, and we project the adjacent sides of the box to divide the space in two parts. The level sets of $J_q$ over $O_q$ are shown in FIGS. 4 and 5. Note that $O_1 \cup O_2$ covers all $R^2$ except for the box that includes the obstacle. Also, note that under this construction the function (23) is smooth for each q∈{1,2}.

To define the set of points where the state q needs to be switched, let p=[x$_1$,y$_1$]$^T$ be the position of the vehicle, and let $(\mu,\lambda)\in(1,\infty)\times(0,1)$. Then, using the construction (23) for the localization function J$_q$, we define the sets $$C_{p,q} := \left\{(p, q) \in R^2 \times \{1, 2\}: J_q(p) \leq \mu \min_{q' \in \{1,2\}} J_{q'}(p)\right\}, \quad (25)$$

$$D_{p,q} := \left\{(p, q) \in R^2 \times \{1, 2\}: J_q(p) \geq (\mu - \lambda) \min_{q' \in \{1,2\}} J_{q'}(p)\right\}. \quad (26)$$

To characterize the update rule of the switching state q, we define the set-valued mapping Q: R$^2$×{1,2}⇉{1,2} as $$Q(p,q):=\{q'\in\{1,2\}: J_q(p)\geq(\mu-\lambda)J_{q'}(p)\}. \quad (27)$$

Finally, using the localization function J$_q$, the sets C$_{p,q}$ and D$_{p,q}$, the set-valued mapping Q(•), and by modifying the dynamics (2.1), we obtain an adaptive hybrid feedback law with flow dynamics $$\left.\begin{aligned}\dot{\xi}_x &= -\varpi\cdot\left(\xi_x - \frac{2}{a}\cdot J_q(x,y)\cdot\mu_1\right)\\ \dot{\xi}_y &= -\varpi\cdot\left(\xi_y - \frac{2}{a}\cdot J_q(x,y)\cdot\mu_2\right)\end{aligned}\right\},\xi\in\lambda B \quad (28)$$

$$\left.\begin{aligned}\dot{x}_1 &= a\cdot\omega\cdot\mu_2 + k\cdot\xi_x\\ \dot{y}_1 &= -a\cdot\omega\cdot\mu_1 + k\cdot\xi_y\\ \dot{q} &= 0\end{aligned}\right\}, (p, q)\in C_{p,q} \quad (29)$$

$$\left.\begin{aligned}\dot{\mu}_1 &= \omega\cdot\mu_2\\ \dot{\mu}_2 &= -\omega\cdot\mu_1\end{aligned}\right\}, \mu\in S^1. \quad (30)$$

where k=σ·$\tilde{\omega}$, and jump dynamics $$\left.\begin{aligned}\xi_x^+ &= \xi_x\\ \xi_y^+ &= \xi_y\end{aligned}\right\}, \xi\in\lambda B \quad (31)$$

$$\left.\begin{aligned}x_1^+ &= x\\ y_1^+ &= y\\ q^+ &\in Q(p, q)\end{aligned}\right\}, (p, q)\in D_{p,q} \quad (32)$$

$$\left.\begin{aligned}\mu_1^+ &= \mu_1\\ \mu_2^+ &= \mu_2\end{aligned}\right\}, \mu\in S^1. \quad (33)$$

In the HDS (27)-(33) the constant $\lambda\in R_{>0}$ is used to constraint the state $\xi$ to a compact set, and it can be selected arbitrarily large to model any complete solution of interest.

The main idea behind the hybrid feedback law (27)-(33) is as follows: The vehicle continuously measures the source signal J(x,y), and at the same time calculates the term B(d$_q$(x,y)) for both q=1 and q=2, obtaining the values J$_1$(x(t), y(t)) and J$_2$(x(t), y(t)) in (23) at each t≥0. Whenever q(t)=1 and J$_1$(t)≥(μ−λ)·J$_2$(t), the state q is update to q$^+$=2 and the signal used in (28) is changed from J$_1$ to J$_2$. Whenever q(t)=2 and J$_2$(t)≥(~−λ)·J$_1$(t), the state q is update to q$^+$=1 and the signal used in (28) is changed from J$_2$ to J$_1$. By implementing this switching feedback law the leader vehicle will always implement—on average—a gradient ascent law over the set O$_q$, where no problematic set M arises. The parameter μ>1 is used to avoid recurrent jumps which could be potentially generated by additive dithering signals or noise on the position state p. On the other hand, the parameter $\lambda\in(0,1)$ is used to inflate the jump set such that existence of solutions is guaranteed under small perturbations on the state. Note that this two parameters are critical for the hybrid learning dynamics, since applying the change of variables (8) to equations (25) and (26) will generate sets C$_{\tilde{p},q}$ and D$_{\tilde{p},q}$ defined over $(\tilde{p}+a\mu,q)$ instead of $(p,q)$. Thus the parameters (μ, λ) guarantee good behavior of the system under the additive term aμ which will be treated as a small perturbation on the flow and jump sets.

2.3 Analysis of Hybrid Adaptive Seeking Dynamics

To analyze the hybrid adaptive law (27)-(33) we follow a similar path as in the analysis of system (3)-(7), this time using averaging and singular perturbation results for hybrid dynamical systems and hybrid extremum seeking control. Using the change of variable (8) we obtain the following hybrid system in the $\tilde{\rho}$-time scale (which only affects the flows)

$$\left.\begin{aligned}\dot{\xi}_x &= -\varpi\cdot\left(\xi_x - \frac{2}{a}\cdot J_q(\tilde{p}+a\mu)\cdot\mu_1\right)\\ \dot{\xi}_y &= -\varpi\cdot\left(\xi_y - \frac{2}{a}\cdot J_q(\tilde{p}+a\mu)\cdot\mu_2\right)\end{aligned}\right\}, \xi\in\lambda B \quad (34)$$

$$\left.\begin{aligned}\dot{\tilde{x}} &= k\cdot\xi_x\\ \dot{\tilde{y}} &= k\cdot\xi_y\\ \dot{q} &= 0\end{aligned}\right\}, (\tilde{p}, q)\in C_{\tilde{p}+a\mu,q}$$

$$\left.\begin{aligned}\frac{\varpi}{\omega}\cdot\mu_1 &= \mu_2\\ \frac{\varpi}{\omega}\cdot\mu_2 &= -\mu_1\end{aligned}\right\}, \mu\in S^1,$$

and jump dynamics $$\left.\begin{aligned}\xi_x^+ &= \xi_x\\ \xi_y^+ &= \xi_y\end{aligned}\right\}, \xi\in\lambda B \quad (35)$$

$$\left.\begin{aligned}\tilde{x}^+ &= \tilde{x}\\ \tilde{y}^+ &= \tilde{y}\\ q^+ &\in Q(\tilde{p}+a\mu, q)\end{aligned}\right\}, (\tilde{p}, q)\in D_{\tilde{p}+a\mu,q}$$

$$\left.\begin{aligned}\mu_1^+ &= \mu_1\\ \mu_2^+ &= \mu_2\end{aligned}\right\}, \mu\in S^1.$$

For this system we will treat the additive term aμ in the sets $C_{\tilde{p}+a\mu,q}$, $D_{\tilde{p}+a\mu,q}$, and the mapping $Q(\tilde{p}+a\mu)$, as a small perturbation acting on the position state $\tilde{p}$. Thus the stability analysis will be based on a nominal system where this perturbation is set to zero, using later robustness principles to establish the stability properties of the perturbed system (34)-(35). Based on this, and following the same procedure as in Section 2.1, for values of $$\frac{\varpi}{\omega}$$

sufficiently small, we obtain the average system of the nominal system, which is also hybrid, with flow dynamics in the α-time scale given by $$\left.\begin{aligned}\sigma\cdot\dot{\xi}_x^A &= -\left(\xi_x^A - \frac{\partial J(\tilde{x}^A, \tilde{y}^A)}{\partial \tilde{x}^A} + e_r\right)\\ \sigma\cdot\dot{\xi}_y^A &= -\left(\xi_y^A - \frac{\partial J(\tilde{x}^A, \tilde{y}^A)}{\partial \tilde{y}^A} + e_r\right)\end{aligned}\right\}, \xi \in \lambda B$$

$$\left.\begin{aligned}\dot{\tilde{x}}^A &= \xi_x^A\\ \dot{\tilde{y}}^A &= \xi_y^A\\ \dot{q}^A &= 0\end{aligned}\right\}, (\tilde{p}^A, q^A) \in C_{\tilde{p}^A, q^A}$$

and jump dynamics given by $$\left.\begin{aligned}\xi_x^{A+} &= \xi_x^A\\ \xi_y^{A+} &= \xi_y^A\end{aligned}\right\}, \xi^A \in \lambda B$$

$$\left.\begin{aligned}\tilde{x}^{A+} &= \tilde{x}^A\\ \tilde{y}^{A+} &= \tilde{y}^A\\ q^{A+} &\in Q(\tilde{p}^A, q^A)\end{aligned}\right\}, (\tilde{p}^A, q^A) \in D_{\tilde{p}^A, q^A}.$$

For values of σ sufficiently small, this HDS is a singularly-perturbed HDS, with ξ-dynamics acting as fast dynamics. The reduced or "slow" system is obtained to be the hybrid system with flows in the α-time scale given by $$\left.\begin{aligned}\dot{\tilde{z}}_x &= \frac{\partial J_q(\tilde{z})}{\partial \tilde{z}_x} + e_r\\ \dot{\tilde{z}}_y &= \frac{\partial J_q(\tilde{z})}{\partial \tilde{z}_x} + e_r\\ \dot{q} &= 0\end{aligned}\right\}, (\tilde{z}, q) \in C_{\tilde{z}, q}, \quad (36)$$

and jumps given by $$\left.\begin{aligned}\tilde{z}_x^+ &= \tilde{z}_x\\ \tilde{z}_y^+ &= \tilde{z}_y\\ q^+ &\in Q(\tilde{z}, q)\end{aligned}\right\}, (\tilde{z}, q) \in D_{\tilde{z}, q}. \quad (37)$$

The parameter ρ just needs to be selected sufficiently small such that ρ is strictly smaller than the distance of the source to the sets $O_q$. Note that this is always possible since one can rotate the box that encircles the obstacle. However, since the position of the source is unknown we can only get the existence of said ρ.

Having stablished a stability result for the average-reduced hybrid system (36)-(37), we can now obtain a stability result for the original system (29)-(33).

Theorem 2.4 Suppose that Assumption 1.2 holds with maximizer $\tilde{p}^* = [\tilde{x}, \tilde{y}^*]^T$. Then there exists a ρ>0 such that for each compact set $K \subset R^2$ such that $(\tilde{x}, \tilde{y}) \in \text{int}(K)$ there exists a λ>0 such that the set $\lambda B \times \{[\tilde{x}, \tilde{y}]^T\} \times S^1$ is GP-AS as $$\left(a, \sigma, \frac{\omega}{\omega}\right) \to 0^+$$

for the HDS (34)-(35) with flow set $\lambda B \times (C_{\tilde{p}+a\mu, q} \cap K) \times S^1$ and jump set $\lambda B \times (D_{\tilde{p}+a\mu, q} \cap K) \times S^1$.

2.4 Followers Dynamics (Formation Control Algorithm)

In order to guarantee that the followers converge to the formation set $F_\Xi$, we consider the following formation control law for the follower vehicles $$\left.\begin{aligned}u_{x,i} &= -\beta \sum_{j \in N_i} \left(x_i - x_j - x_i^f + x_j^f\right)\\ u_{y,i} &= -\beta \sum_{j \in N_i} \left(y_i - y_j - y_i^f + y_j^f\right)\end{aligned}\right\}, (x_i, y_i) \in \overline{\lambda B \backslash N}, \quad (38)$$

for all $i \in \{1, \ldots, N-1\}$, where λ>0 is again a constant selected sufficiently large to encompass all complete solutions of interest, and which is used only for the purpose of analysis. The stability analysis of the follower's dynamics assumes that the position of the leader vehicle is fixed, i.e., $\dot{x}_1 = 0$ and $\dot{y} = 0$.

Lemma 2.5 Suppose that Assumptions 1.1 and 1.3 hold. Consider the system comprised of the follower dynamics (38) and the leader dynamics $\dot{x}_1 = 0$ and $\dot{y}_1 = 0$ with $[x_1(0), y_1(0)]^T \in R^2 \backslash N$. Then, every complete solution of this system converges exponentially fast to the point $$\left.\begin{aligned}p_x^* &= x^f + 1_N \cdot x_1(0)\\ p_y^* &= y^f + 1_N \cdot y_1(0)\end{aligned}\right\} \in F_\Xi. \quad (39)$$

2.5 Closed-Loop System

We now consider the closed-loop system given by the leader vehicle with feedback law (29)-(33) and the follower vehicles with feedback law for all $i \in \{2, \ldots, N\}$. Let $s_1 = [\xi_x, \xi_y, x_1, y_1, q, \mu_1, \mu_2]^T$ $s_{f,x} = [x_2, \ldots, x_N]^T$, and $s_{f,y} = [y_1, \ldots, y_N]$. The following theorem establishes that if the trajectories of the followers avoid the obstacle, then they will achieve the formation Ξ around the leaders position in a neighborhood of (x*, y*).

Theorem 2.6 Suppose that Assumptions 1.1, 1.2, and 1.3 hold, and consider the adaptive hybrid feedback law (2.1), (2.1), (7) for the leader vehicle, and the consensus feedback law (38) for the follower agents. Let $\lambda \in (0,1)$, $\mu > 1$. Then, there exists a ρ>0 such that for each compact set $K \subset R^2$ containing (x*, y*) and the initial positions of the vehicles, and for each ε>0, there exists parameters $$\left(a, \sigma, \frac{\omega}{\omega}\right) \text{ and } \frac{1}{\beta} > 0$$

sufficiently small, such that for each complete solution of the closed-loop system the leader vehicle will converge to the set $\{[x^*, y^*]\} + \varepsilon B$ in finite time, and the follower vehicles will converge to the set $\{[x'+1_N x^*, y'+1_N y^*]\} + \varepsilon B$ in finite time.

Theorem 2.6 guarantees that complete trajectories of the vehicles from all initial conditions will converge to a neighborhood of the maximizer (x*, y*) of the source J, with the followers achieving the desired formation Ξ. Nevertheless, in real-world applications, one may not be interested in establishing convergence of complete solutions from all possible initial conditions, but rather convergence and completness of solutions from a specific subset of points in the plane. In fact, even though the leader will always avoid the obstacle from any initial condition, since the followers do not implement a hybrid feedback law there is no guarantee that they would avoid the obstacles from all possible initial conditions. To guarantee this property we can focus on the set of points $X_p \subset R^{2(N-1)}$ such that if p is the position of the leader, $\dot{p}=0$, and $R(X_p)$ is the reachable set of (38) from $X_p$, there exists an $\varepsilon > 0$ such that the intersection of $R(X_p) + \varepsilon B$ and the obstacle is empty. Then in this case one can choose $\beta$ sufficiently large to guarantee that all the followers with initial conditions in $X_p$ will achieve formation around the leader in a fast time scale without touching the obstacle. This follows by standard singular perturbation arguments. Then, by selecting the height of the box h sufficiently large compared to the size of the formation, the followers will also avoid the obstacle as the leader moves towards the source $(x^*,y^*)$. We illustrate this behavior with a numerical example in the following section.

NUMERICAL EXAMPLES

We apply the results of the previous sections to a group of 6 vehicles aiming to achieve formation around the source of a signal J, which can be sense by the leader agent. For the purpose of simulation we assume that this signal has a quadratic form $$J = \frac{1}{2}(x_1 - 3)^2 + \frac{1}{2}y_1^2,$$

with maximum at the point (3,0). We emulate the situation where the 6 robots are initially located at the entrance of a room, and where the source of the signal J is only know to be located at the other side of the room, with an obstacle N located in the middle of the room at the point (1,0). The parameters of the controller are selected as h=0.5, $\rho$=0.4, $\lambda$=0.09, $\rho$=1.1, a=0.01, $\overline{\omega}$=1, k=1, and $\beta$=4. The desired formation is characterized by the set $$\Xi = \left\{ (-2, 0.5), (-2, -0.5), \left( \frac{\sqrt{3}-4}{2}, 0 \right), \right. \\ \left. (0, 0), \left( \frac{-\sqrt{3}-4}{2}, 1 \right), \left( \frac{\sqrt{3}-4}{2}, -1 \right) \right\}. \quad (40)$$

Figure 6:
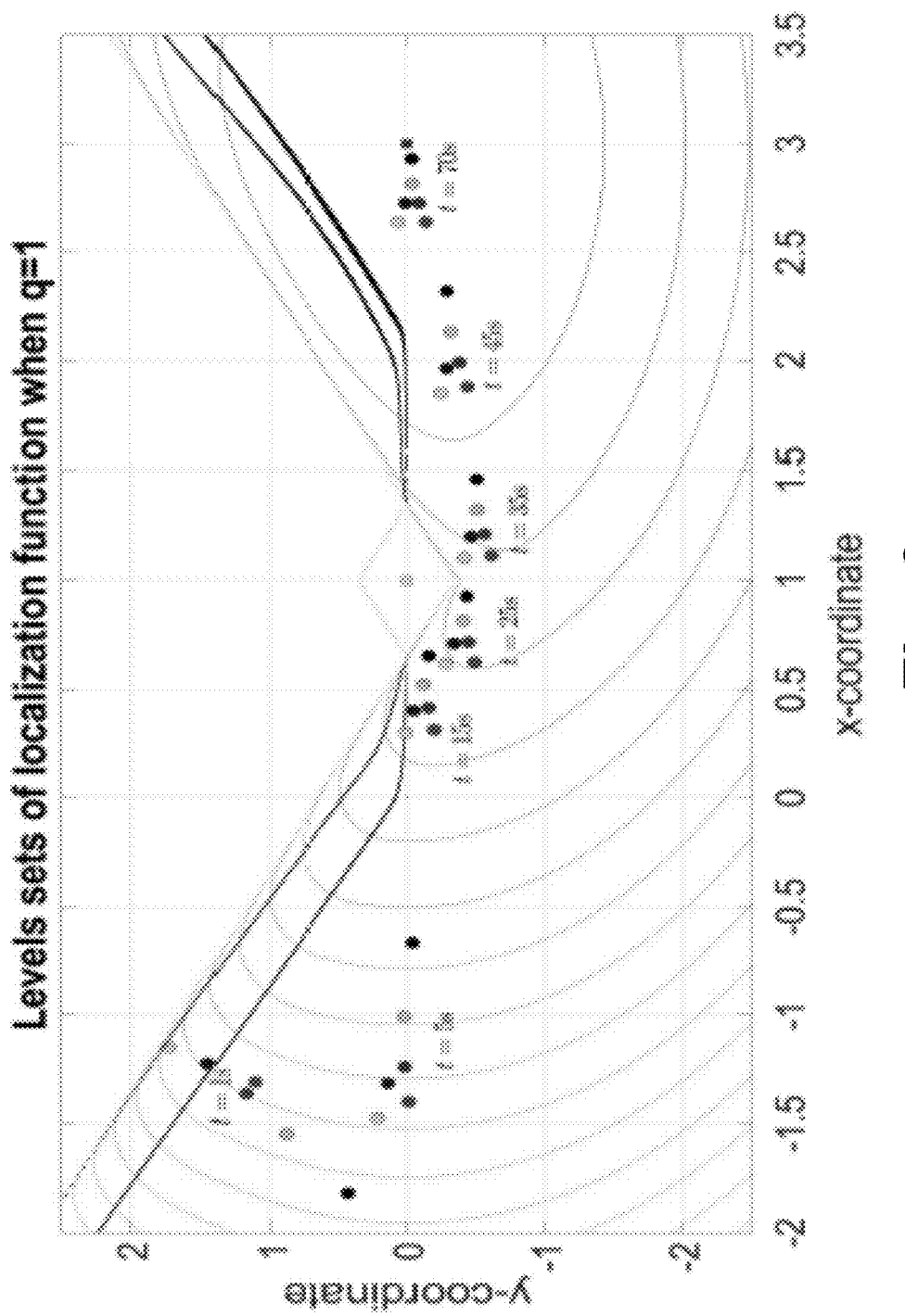
FIG. 6 shows an example illustrating the evolution of the vehicles along time over the level sets of $J_1$, according to embodiments of the present invention.
Figure 7:
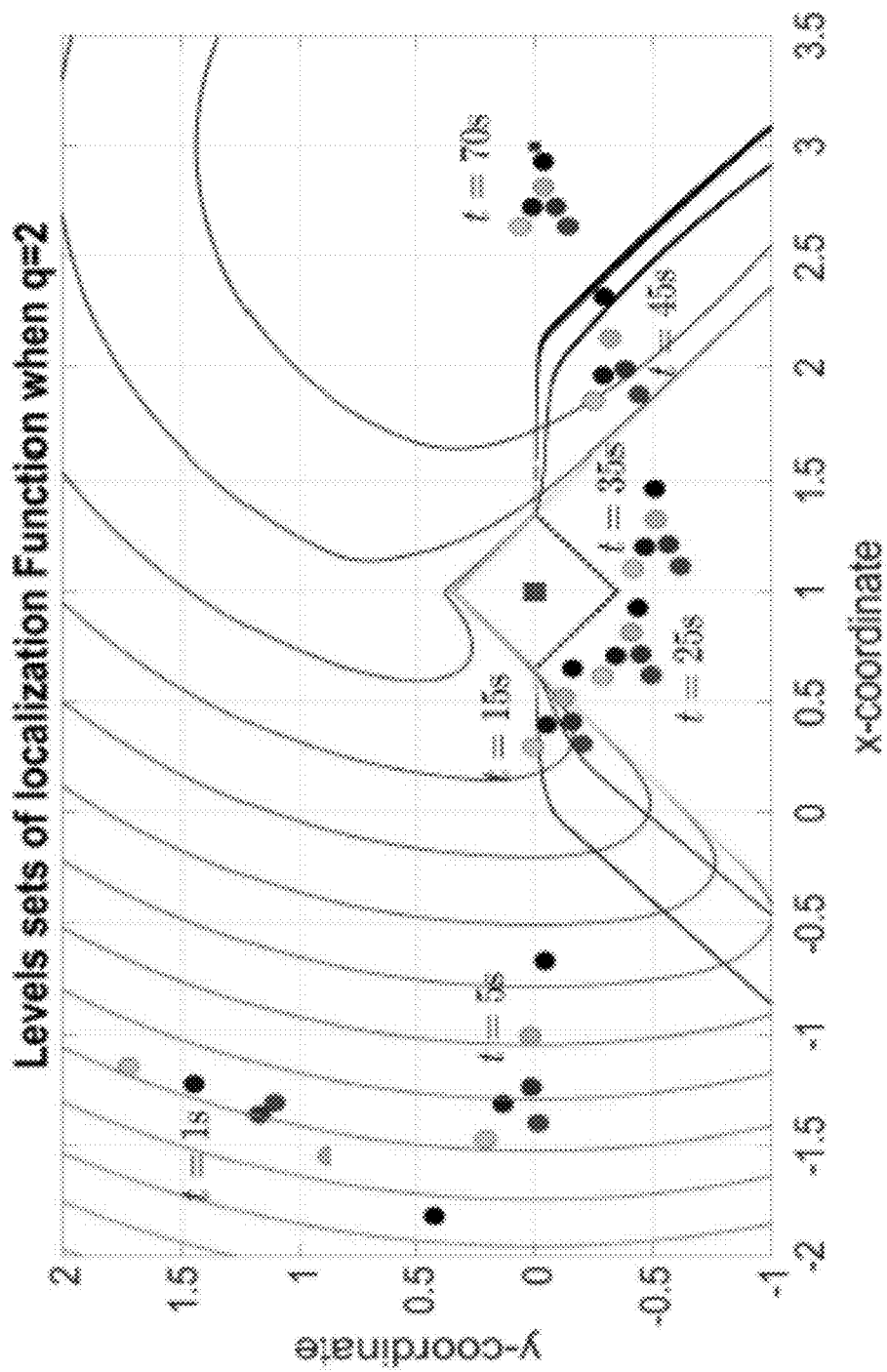
FIG. 7 shows an example illustrating the evolution of the vehicles along time over the level sets of $J_2$, according to embodiments of the present invention.

FIG. 6 shows an example illustrating the evolution of the vehicles along time over the level sets of $J_1$, and FIG. 7 shows an example illustrating the evolution of the vehicles along time over the level sets of $J_2$, according to embodiments of the present invention.

FIGS. 6 and 7 show the position of the vehicles at 7 different time instants. After approximately 5 seconds the follower agents have achieved the desired formation behind the leader agent (shown as the bacl dot). The leader implements the hybrid feedback law initially with q=2, and at approximately 9 seconds it enters the jump set shown in FIG. 7 and updates its logic mode state as $q^+=1$, flowing now crossing the level sets shown in FIG. 6. Since the box around the obstacle is constructed sufficiently large, the followers also avoid the obstacle by keeping the required formation. After approximately 70 seconds the vehicles have converged to a neighborhood of the source.

Figure 8:
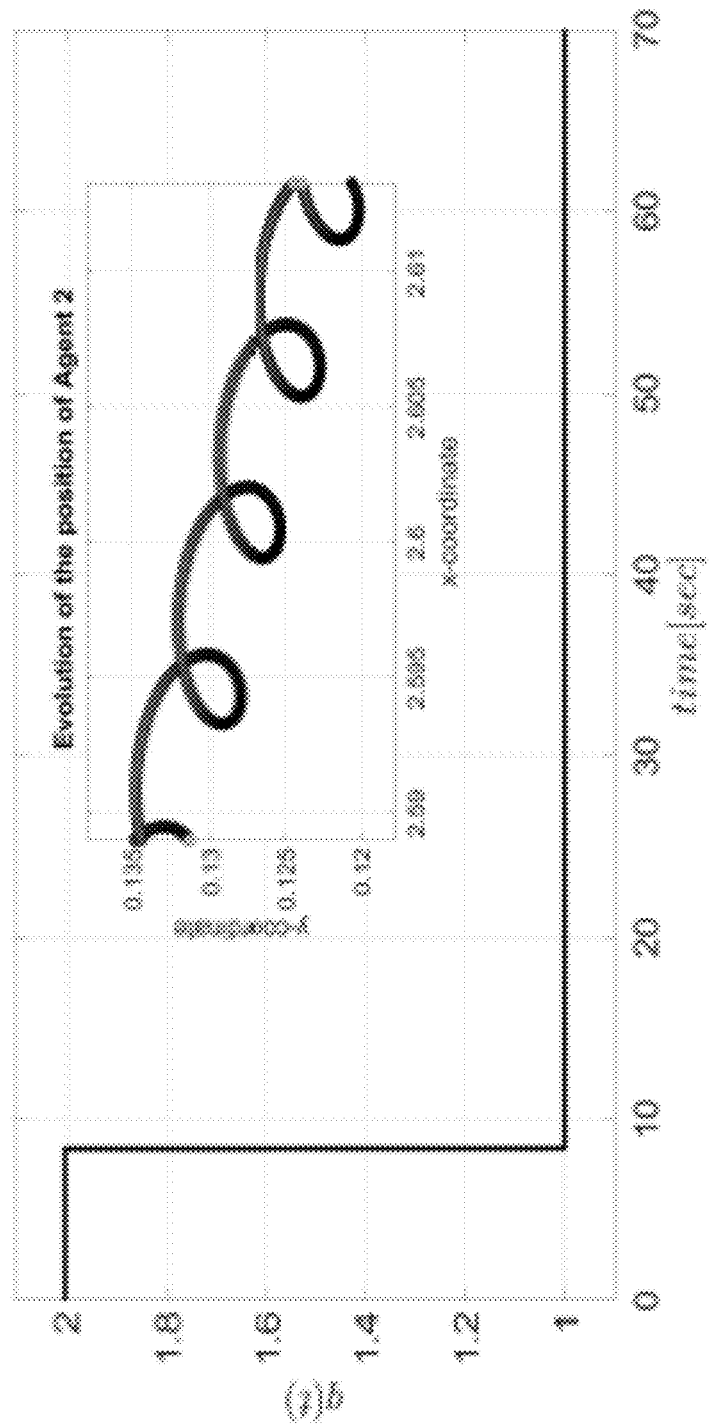
FIG. 8 shows an example illustrating the evolution in time of the logic state q, according to embodiments of the present invention.

FIG. 8 shows an example illustrating the evolution in time of the logic state q, according to embodiments of the present invention. In the figure, the inset shows the oscillatory behavior of the followers trajectories induced by the adaptive feedback law (28)-(33) of the leader.

According to embodiments of the present disclosure, a robust adaptive hybrid feedback law is provided for a group of vehicles seeking for the source of an unknown signal J, in which a distance to the source is unmeasurable, and aiming to achieve a desired formation. The feedback law can be stored into the memory 140 or the storage 130 as an algorithm, and can impliment a switching state q that is switched based on a geometric construction around the obstacles position by using the processor 120. By implementing this hybrid law, no problematic set of measure zero of initial conditions arises. Moreover, the feedback law is robust to small perturbations and adversarial signals, and does not need to know the mathematical form of the signal J. By implementing a consensus based law, the follower vehicles achieve a desired formation parameterized by the position of the leader, and from initial conditions whose inflated reachable set does not include the obstacles position, the group of followers is also guaranteed to avoid the obstacle as the leader seeks for the source. Interesting future research directions include the implementation of a hybrid and distributed control law for the follower vehicles.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A vehicle control system in a vehicle for driving the vehicle toward a source while avoiding an obstacle comprising:
   a first sensor to measure a first intensity of a source signal from the source, wherein a distance to the source is unmeasurable;
   a second sensor to detect an obstacle and a second vehicle, wherein the second sensor measures a first distance to the obstacle and a second distance to the second vehicle;
   an interface to receive data of a second intensity of the source signal measured by the second vehicle and transmit the data of the first and second intensities via a wireless channel;
   a memory, in connection with the interface and the first and second sensors, to store the data of the first and second intensities, an autonomous program, a leader algorithm and a follower algorithm for autonomously driving the vehicle;
   a processor, in connection with the memory, to select one of the leader algorithm and the follower algorithm based on the data of the first and second intensities using the autonomous program and generate control signals including driving parameters of the vehicle according to the selected one of the algorithms, wherein the processor selects the leader algorithm when the first intensity is greater than the second intensity, wherein the processor selects the follower algorithm when the first intensity is less than the second intensity, and wherein when the first intensity is equal to the second intensity, the processor selects the leader algorithm if a first timestamp of the first intensity is earlier than a second timestamp of the second intensity otherwise the processor selects the follower algorithm; and
   a machinery control circuit connected to the processor to drive a machinery of the vehicle according the control signals.

2. The vehicle control system of claim 1, wherein when the interface further receives third intensities measured by third vehicles, the processor selects the leader algorithm when the first intensity is greater than the second intensity and greater than the third intensities, wherein the processor selects the follower algorithm when the first intensity is less than the second intensity or less than the third intensities, and wherein when the first intensity is equal to a greatest intensity among the second and third intensities, the processor selects the leader algorithm if a first timestamp of the first intensity is earlier than a second timestamp of the greatest intensity otherwise the processor selects the follower algorithm.

3. The vehicle control system of claim 2, wherein the vehicle and the second and third vehicles communicate according to a message passing algorithm stored in the memory of each of the vehicles, wherein each of the vehicles communicates with neighboring vehicles.

4. The vehicle control system of claim 2, wherein when the processor detects at least one predetermined failure signal from the first sensor or the second sensor while executing the leader algorithm, the processor generates and transmits a leader switching request signal via the interface.

5. The vehicle control system of claim 4, wherein the predetermined failure signals include predetermined failure thresholds of the first intensity, a velocity of the vehicle, a communication signal intensity of the vehicle and the first distance.

6. The vehicle control system of claim 2, wherein the processor executing the leader algorithm recognizes a failure status of the vehicle when the first intensity measured by the first sensor has not changed for a threshold time period while updating the first intensity.

7. The vehicle control system of claim 2, wherein the processor executing the follower algorithm recognizes a failure status of another vehicle when the interface receives a follower failure signal of the other vehicle via the wireless channel.

8. The vehicle control system of claim 2, wherein when the processor detects a failure signal from a leader vehicle executing the leader algorithm via the interface while executing the follower algorithm, the processer updates the first intensity by remeasuring the source signal and and updates the second and third intensities by communicating with neighboring vechicles via the interface according to a message passing algorithm stored in the memory, wherein the processor selects the leader algorithm when the updated first intensity is greater than the updated second intensity and greater than the updated third intensities, wherein the processor selects the follower algorithm when the updated first intensity is less than the updated second intensity or less than the updated third intensities, and wherein when the updated first intensity is equal to a greatest intensity among the updated second and updated third intensities, the processor selects the leader algorithm if a first timestamp of the updated first intensity is earlier than a second timestamp of the updated greatest intensity otherwise the processor selects the follower algorithm.

9. The vehicle control system of claim 1, wherein the follower algorithm is a formation control algorithm.

10. The vehicle control system of claim 1, wherein when the second vehicle is not detected by the second sensor, the processer selects the leader algorithm.

11. The vehicle control system of claim 1, wherein the driving parameters of each of the vehicles include a direction, a velocity and a movement time period.

12. The vehicle control system of claim 1, wherein when the processor selects the follower algorithm, the control signals cause the machinery to start moving after the second sensor detects a movement of the second vehicle.

13. The vehicle control system of claim 12, wherein the movement of the second vehicle is detected when the second distance to the second vehicle measured in a next cycle period of time is changed.

14. The vehicle control system of claim 1, wherein the processor computes a virtual boundary around the obstacle, and wherein each of the vehicles maintains a predetermined minimum distance away from the virtual boundary.

15. The vehicle control system of claim 1, wherein the leader algorithm is a hybrid-extreme-seeker algorithm.

16. The vehicle control system of claim 15, wherein the hybrid-extreme-seeker algorithm is designed as follows $$u_{x,1} = a\omega\mu_2 + k\xi_x$$
$$u_{y,1} = -a\omega\mu_1 + k\xi_y,$$
$$\left. \begin{array}{l} \dot{\xi}_x = -\varpi(\xi_x - 2a^{-1} \cdot J_q(x, y) \cdot \mu_1) \\ \dot{\xi}_y = -\varpi(\xi_y - 2a^{-1} \cdot J_q(x, y) \cdot \mu_2) \end{array} \right\}, \xi \in \mathbb{R}^2$$

$$\left. \begin{array}{l} \dot{x}_1 = a\omega\mu_2 - k\xi_x \\ \dot{y}_1 = -a\omega\mu_1 - k\xi_y \\ \dot{q} = 0 \end{array} \right\}, (p, q) \in C_j$$

-continued $$\left.\begin{array}{l}\dot{\mu}_1 = \omega\mu_2 \\ \dot{\mu}_2 = -\omega\mu_1\end{array}\right\}, \mu \in \mathbb{S}^1.$$

$$J_q(x_1, y_1) := -J(x_1, y_1) + B(d_q(x_1, y_1)),$$

$$B(z) = \begin{cases} (z-\rho)^2 \log\left(\frac{1}{2}\right), & \text{if } z \in [0, \rho] \\ 0, & \text{if } z > \rho, \end{cases}$$

wherein, a, k, $\rho$, $\omega$, $\overline{\omega}$ are positive gains, $d_q$ represents the distance between the vehicle and the obstacle, and J represents a source intensity function.

17. The vehicle control system of claim 1, wherein the vehicle is a robot that includes machineries to move.

18. A non-transitory computer readable recording medium storing thereon a program causing a processor to execute a vehicle control process for driving a vehicle toward a source while avoiding an obstacle, the vehicle control process comprising steps:

measuring, using a first sensor, a first intensity of a source signal from the source, wherein a distance to the source is unmeasurable;

detecting, using a second sensor, an obstacle and a second vehicle, wherein the detecting includes measuring a first distance to the obstacle and a second distance to the second vehicle;

receiving, using an interface, data of a second intensity of the source signal measured by the second vehicle, and transmitting the data of the first and second intensities via a wireless channel;

storing, using a memory in connection with the interface and the first and second sensors, the data of the first and second intensities, an autonomous program, a leader algorithm and a follower algorithm for autonomously driving the vehicle;

selecting, using the processor in connection with the memory, one of the leader algorithm and the follower algorithm based on the data of the first and second intensities using the autonomous program, and generating control signals including driving parameters of the vehicle according to the selected one of the algorithms, wherein the processor selects the leader algorithm when the first intensity is greater than the second intensity, wherein the processor selects the follower algorithm when the first intensity is less than the second intensity, and wherein when the first intensity is equal to the second intensity, the processor selects the leader algorithm if a first timestamp of the first intensity is earlier than a second timestamp of the second intensity otherwise the processor selects the follower algorithm; and transmitting the control signal to a machinery control circuit connected to the processor to drive a machinery of the vehicle according the control signals.

* * * * *